United States Patent [19]
Bäder et al.

[11] Patent Number: 5,458,445
[45] Date of Patent: Oct. 17, 1995

[54] TOOL HOLDER, IN PARTICULAR A FAST EXCHANGE CHUCK

[75] Inventors: Siegfried Bäder, Köngen; Lothar Höfle, Ostfildern; Gerhard Babel, Esslingen, all of Germany

[73] Assignee: Otto Bilz, Werkzeugfabrik GmbH & Co., Ostfildern, Germany

[21] Appl. No.: 230,754

[22] Filed: Apr. 21, 1994

[30] Foreign Application Priority Data

Apr. 30, 1993 [DE] Germany .......................... 43 14 235.4

[51] Int. Cl.⁶ ........................... B23B 31/08; B23B 51/06
[52] U.S. Cl. ........................... 408/141; 279/16; 408/57
[58] Field of Search ................................... 408/141, 142, 408/56, 57, 59; 279/75, 16, 20, 157; 470/103

[56] References Cited

U.S. PATENT DOCUMENTS

| | | | |
|---|---|---|---|
| 3,325,837 | 6/1967 | Hartmann | 408/141 |
| 3,787,136 | 1/1974 | Steiner | 470/103 |
| 4,547,105 | 10/1985 | Hofle et al. | 408/141 |
| 4,752,088 | 6/1988 | Stahl et al. | 285/169 |
| 5,076,740 | 12/1991 | Petrie | 408/141 |

FOREIGN PATENT DOCUMENTS

| | | | |
|---|---|---|---|
| 0464335 | 8/1992 | European Pat. Off. . | |
| 3902559 | 2/1990 | Germany . | |

*Primary Examiner*—Steven C. Bishop
*Attorney, Agent, or Firm*—Michael J. Striker

[57] ABSTRACT

A tool holder, particularly a fast exchange chuck preferably for thread cutting, thread shaping and the like has a receptacle having one end receivable in a machine spindle, a machine tool receptacle and the like, and another opposite end provided with a head having a coaxial cylindrical head opening, a housing received and guided in the cylindrical head opening non-rotatably but displaceably in a longitudinal direction and provided with a coaxial cylindrical housing opening, a fast exchange insert insertable in the housing opening a torque-transmitting unit for transmitting torque between the head and the housing and including a head longitudinal groove provided in the head, a housing longitudinal groove provided in the housing, and at least one drive body partially received in each of the longitudinal grooves so as to transmit torque between the head and the housing and to roll during a relative displacement between said head and said housing. The at least one drive body is arranged between said head and said housing guidance-free with respect to its position in a longitudinal direction and is acted upon from outside inwardly with a pressing force, and an elastic clamping member applies the pressing force from outside inwardly to the drive member.

33 Claims, 2 Drawing Sheets

TOOL HOLDER, IN PARTICULAR A FAST EXCHANGE CHUCK

BACKGROUND OF THE INVENTION

The present invention relates to a tool holder, in particular to a fast exchange chuck.

Tool holders of the above mentioned general type are known in the art. One of such tool holders is disclosed for example in the German document DE-39 02 559 A1. In this tool holder at least one drive body is arranged in a spherical guiding sleeve and guided in a longitudinal direction to its position, while the spherical guiding sleeve is received and guided on the one hand in a precisely determined ring chamber between the head of the receptacle and the housing. Therefore during a relative movement between the head and the housing the spherical guiding sleeve with its balls can roll along the contact surfaces of the head and the housing. Thereby the at least one drive head, in particular a drive sphere, is held during its relative displacement in its position and can roll between them. Such a spherical guiding sleeve is a relatively expensive structural element. Disadvantageous in this construction is also the fact that the outer surfaces of the housing and the inner surface of the head of the receptacle which surrounds the housing with a distance and on which the spheres of the spherical guiding sleeves roll must be produced very precisely and must be exactly coordinated with one another. This requires an expensive machining. It has been also recognized that the dirt which penetrates in the ring chamber and can act on the spherical guiding sleeve can lead fast to difficulties or complete clamping in the region of the spherical guiding sleeves between the head of the receptacle on the one hand and the housing on the other hand. The spherical guiding sleeve with its concept is therefore not always disturbance free and during its operation is susceptible to dirtying.

SUMMARY OF THE INVENTION

Accordingly, it is an object of the present invention to provide a tool holder, in particular a fast exchange chuck, which avoids the disadvantages of the prior art.

More particularly, it is an object of the present invention to provide a tool holder, in particular a fast exchange chuck, which is simpler, less expensive, more compact and less susceptible to disturbances and dirtying.

In keeping with these objects and with others which will become apparent hereinafter, one feature of the present invention resides, briefly stated, in a tool holder of the above mentioned type in which at least one drive body is arranged between the head and the housing with respect to its position in a longitudinal direction guidance-free and loaded with an elastic clamping member from outside inwardly with a pressing force.

When the tool is designed in accordance with the present invention, it eliminates the disadvantages of the prior art and provides for the above mentioned highly advantageous results.

When the tool holder is designed in this manner, a spherical guiding sleeve for the holding the at least one drive body in its position, in particular a drive sphere is dispensed with. This part is not provided at all, so that it saves cost and reduces the number of structural elements. Also no guiding surfaces are provided which would require high precision for guidance of the spherical guiding sleeve. The corresponding outer surface of the housing and inner surface of the head of the receptacle must not be determined precisely with maintaining of their exact fit with respect to one another. Therefore the manufacturing cost and the expenses for the assembly are substantially reduced. The tool holder is substantially more compact, simpler, lighter, and in general substantially less expensive. Dirt penetrating between the head of the receptacle and the housing does not influence the operation of the tool holder. The tool holder therefore operates over a longer time and has higher operational safety and functional reliability which is not affected by dirt. All above specified disadvantages are therefore eliminated. The tool holder in accordance with the present invention is more operation-reliable and mounting-friendly. In accordance with the present invention, the at least one drive body, for example a drive sphere, is held in a longitudinal direction between the head and the housing in its position so that the drive body is loaded by an elastic clamping member from outside inwardly with a pressing force which presses the drive body against the longitudinal groove in the housing and hold it in its position.

In accordance with another feature of the present invention the longitudinal groove and the head is formed as a longitudinal slot extending in the transverse direction inside the cylinder wall of the head. The at least one drive body engages in a transverse direction through the longitudinal slot and projects at least insignificantly over an outer side of the head in the region of the longitudinal slot. The elastic clamping member is formed as a circumferential clamping member which at least partially surrounds the head over its outer side in the region of the at least one drive body and engages a projecting part of the at least one drive body from outside. The circumferential clamping member is formed as an elastically springy ring-shaped element of metal. The ring-shaped element can also be formed as a ring or as a cylinder sleeve. The circumferential clamping member is fixed on the head in an axial longitudinal direction. The circumferential clamping member is interrupted in a longitudinal direction in at least one point. The housing is provided with a plurality of the housing longitudinal grooves, at least one of the housing longitudinal grooves has a trapezoidal cross-section which is symmetrical and has a line of symmetry extending in a diametrical plane through a center of the housing. The head has a plurality of the head longitudinal grooves. At least one of the head longitudinal grooves is formed as a longitudinal slot which has two opposite and substantially parallel flanks, each extending in a plane of a secant at a radial distance from a center of the housing and parallel to a diametrical plane extending through the center of the housing. The at least one drive body is formed as a drive ball, and the flanks of the longitudinal slot are spaced from one another by a distance substantially corresponding to a diameter of the drive ball. According to another feature of the invention, the at least one drive body is formed as a drive ball, the flanks of the longitudinal slot are spaced from one another by a distance which is at least insignificantly greater than the diameter of the drive ball. The head has four of the head longitudinal grooves and the housing has four of the housing longitudinal grooves so as to form four cooperating longitudinal groove pairs. The torque transmitting means includes four of the drive bodies each located in a respective one of the longitudinal groove pairs.

The tool holder in accordance with the present invention can be further simplified with additional modifications of its construction. It can be designed so that both during the right and the left running the longitudinal groove of the head presses the associated drive body inwardly and into the longitudinal grooves of the housing rather than allowing its displacement outwardly. It is therefore guaranteed that the elastic clamping member, in particular the elastic peripheral clamping member, is not loaded over the drive body from inside outwardly with a force. Moreover, the peripheral clamping member remains force-free, so that with all drive bodies it can apply the pressing force directed from outside inwardly. Due to the described arrangement of the longitudinal grooves in the head and the orientation of the flanks of the longitudinal grooves a force loading of the drive body both during the right running and the left running, in particular the force loading of the drive spheres, is provided so that the drive bodies are pressed inwardly into the housing-side longitudinal groove, and the displacement outwardly and loading of the peripheral clamping member are completely excluded. This is achieved by simple means without additional structural elements, by the above described arrangement and formation of the longitudinal grooves in the receptacle. Thereby the peripheral clamping member can be provided with small thickness in its cross-section with the resulting high elasticity and force generation to be applied to the drive body. Moreover, the radial space required for it is reduced, and the diameter of the tool holder can be maintained small as a result.

In accordance with another feature of the present invention, the tool holder has an axial longitudinal compensating device for pulling and pressing which simultaneously operates as a pressure amplifier and arranged on the outer side of the head, in particular on the outer side of the peripheral clamping member. These features provide for a special, advantageous inventive solution. In accordance with further features of this solution each of the longitudinal groove pairs is located diametrically opposite to another one of the longitudinal groove pairs in a diametrical plane so that all the longitudinal groove pairs are located opposite to each other in two diametrical planes. The two diametrical planes extend relative to one another at an angle of substantially 60° and a complementary angle of substantially 120°. An axial longitudinal compensating device is provided for pulling and pressing and operating simultaneously as a bevel pressure amplifier, the device being arranged on an outer side of the head and on an outer side of the clamping member. The clamping member is formed as a circumferential clamping member and has an outer side provided with a ring groove, the longitudinal compensating device including a plurality of balls having a circumferential part located in the ring groove. A supporting ring has one side provided with an inclined surface and surrounding the circumferential clamping member, and a spring presses the supporting member so that the inclined surface abuts in an axial longitudinal direction against a projecting circumferential part of the balls.

The thusly designed longitudinal compensating device is extraordinarily simple. It is composed only of several structural elements. It has the advantage that with a single spring a longitudinal compensation of pulling and pressing can be obtained, and moreover, the longitudinal compensating device simultaneously operate a bevel pressure amplifier. This construction is especially simple. It has the further advantage that due to the arrangement of the longitudinal compensating device on the outer side of the head, in particular the peripheral clamping member, the interior of the head and the housing is not filled and is free for other components. Moreover, a shorter axial construction and a smaller outer diameter are possible, so that the fast exchange chuck can be formed more compact.

In accordance with a further special independent feature of the present invention, the tool holder can have a central, inner tube for cooling medium supply which is mounted with a one end on the receptacle and extends from there into the head and into its opening and in a central bore hole of the housing so as to form inside the tube a limited ring chamber sealed at its both axial ends for the cooling medium, and the ring chamber is connected through a passage in the tube with the interior of the tube on the one hand and with outer passages in the housing leading to the cylindrical opening of the housing, on the other hand. In accordance with further advantageous features of this embodiment an outer sleeve surrounds the housing and is fixedly connected with the latter. The outer sleeve having a cylindrical neck which limits a ring chamber with the head and the outer side of the circumferential clamping member, the longitudinal compensating device is arranged in the ring chamber. A ball holder abuts against the outer sleeve in an axial direction and is arranged in the ring chamber. The ball holder has openings in which the balls are held. The supporting ring is arranged on an associated end of the ball holder and contacting with the inclined surface the balls which at least insignificantly project at the end. A central inner pipe for a cooling medium supply is provided. The pipe has an end mounted on the receptacle and extending from the end into the head and into the head opening and also in a central opening of the housing, the tube containing an inner ring chamber provided for a cooling medium and sealed at both its axial ends, the ring chamber communicating with an interior of the tube through at least one channel and also communicating with a plurality of channels provided in the housing outside its center and leading to the housing opening. A substantially cup-shaped closure member is provided which is mounted on the housing and forms an additional chamber. The tube has a free end which is closed and extends through a central axial opening in the housing and into the additional chamber. A blocking ring is axially displaceably arranged in the housing opening and surrounds the closure member. The blocking ring is sealed in a circumferential direction relative to the housing. The closure member has an axial end provided with at least one radially extending projection. The blocking ring has an end provided with at least one radially inwardly extending projection which abuts against the radially extending projection of the closure member when the blocking ring is displaced by a spring force. The radially extending projection of the closure member is formed with a ring shoulder, and the radially inwardly extending abutment of the blocking ring is formed as an abutment shoulder.

Since the tube providing the inner cooling medium guidance and forming the tool holder is mounted on the head, during the relative displacement between the head and the housing the pressure column of the cooling medium under pressure does not move along. Uncontrollable relative displacements between the housing and the head which cause co-movements of the pressure column of the cooling medium are completely excluded. The cooling medium guidance can be provided with a few structural elements in a simple, inexpensive manner with a shorter tool holder which also has a more compact diameter. Furthermore, the tool holder is easier to mount. It has also the advantage that with this concept when the fast exchange insert is not inserted between the closing member and the log an automatic closure of the cooling medium passage is structurally actuated and no cooling medium can escape when the fast exchange insert is removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
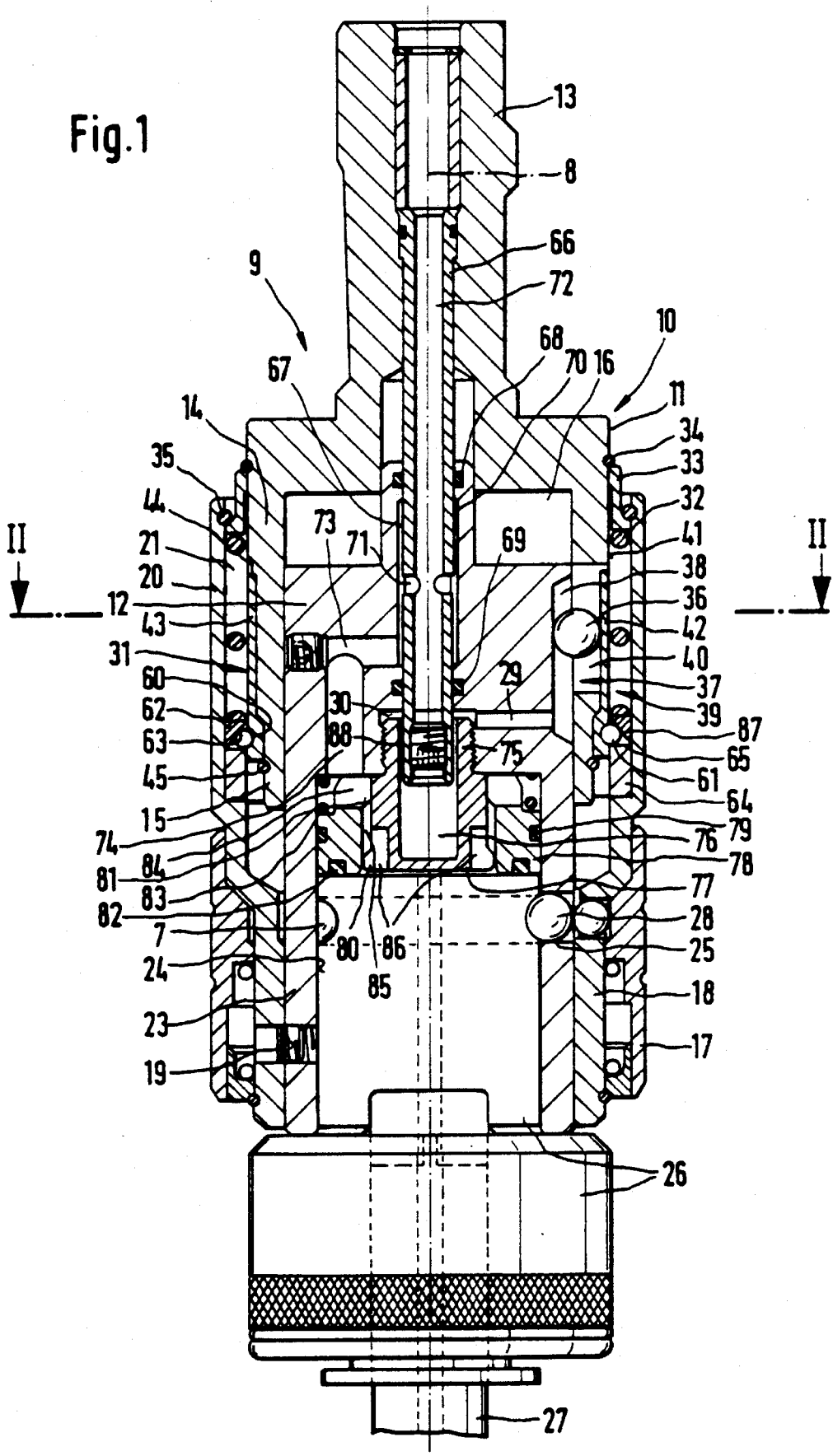
FIG. 1 is a view showing an axial longitudinal section of a tool holder in accordance with the present invention.

A tool holder 9 shown in the drawings has a fast exchange chuck 10, for example for thread cutters, thread shapers and the like. The fast exchange chuck has a receptacle 11 and a housing 12. The receptacle 11 at its upper end 13 shown in FIG. 1 is formed for insertion in a not shown machine spindle, tool receptacle, or the like of a machine tool. The end 13 is formed for example as a shaft which can be received in the not shown machine spindle, tool receptacle, or the like directly or with interposition of a matching element, and coupled with the same for torque transmission.

The receptacle 11 at its opposite end which is the lower end in FIG. 1 is provided with a head 14 having a cylindrical wall 15 with a coaxial cylindrical opening 16. The opening is open upwardly in FIG. 1. The housing 12 is received and guided in the opening 16 non-rotatably, but displaceably in an axial longitudinal direction along the longitudinal central axis 8.

The housing 12 is formed substantially as a reversed cup and has in its lower part a cylindrical wall 23 which surround a coaxial, cylindrical opening 24. The opening 24 opens downwardly in FIG. 1. A conventional fast exchange insert 26 is insertable in the opening 24 and coupled with it in axially and torque-transmitting manner. The fast exchange insert 26 carries a tool 27 which for example is suitable for thread cutting, thread forming, etc. The axial form-locking arresting and rotary transmission of the inserted fast exchange insert 26 is performed in a conventional manner such as is disclosed in the German document DE-OS 39 02 559. It is performed through at least one holding sphere 28 which is held in a radial opening 25 of the cylinder wall 23 of the housing 12. The holding sphere 28 engages in a form-locking manner in an outer ring groove 7 of the fast exchange insert 26. It can be provided with several holding ball spheres 28 arranged in a peripheral direction with distances between one another.

The holding sphere 28 is actuated by an outer actuating sleeve 17 which surrounds an outer sleeve 18 and is displaceable relative to it in an axial direction. The outer sleeve 18 engages the cylindrical wall 23, is fixedly arranged on it and fixedly connected for example by means of a threaded screw 19. The inner diameter of the outer sleeve 18 expands upwardly in FIG. 1 so that with an upper cylindrical neck 20 it surrounds the cylindrical wall 15 of the head 14 to form a ring chamber 21 therebetween. An axial longitudinal compensating device 31 is provided in the ring chamber 21. It operates axially between the housing 12 and the receptacle 11 and provides an axial longitudinal compensation during a relative displacement in both axial directions, or in other words for pulling and pressing. Simultaneously, the longitudinal compensation device 31 operates as a bevel pressure amplifier during pressing in axial direction from above downwardly in FIG. 1. The longitudinal compensating device 31 includes in the ring chamber 21 a single pressure spring 32 for the longitudinal compensation in one or another axial direction. The pressure spring 32 is supported with its upper end against a ring 33 which is secured through a spring ring 34 on the receptacle 11 from displacement upwardly in FIG. 1. Through a spring ring 35 on the inner side of the neck 20, during the relative displacement of the housing 12 in FIG. 1 downwardly, the ring 33 is also displaced downwardly. During a relative displacement of the housing 12 with the outer sleeve 18 upwardly in FIG. 1 the ring 33 remains as an abutment for the pressure spring 32. This is the case when for example during drilling an axial pressure acts from the machine spindle through the receptacle 11 onto the tool 27, and it is received after the response of the bevel pressure amplifier by the pressure spring 32 since the receptacle 11 with the ring 33 moves relative to the housing 12 downwardly in FIG. 1 with a compression of the pressure spring 32.

The head 14 is coupled with the housing 12 in the axial direction and peripheral direction through at least one drive body 36 arranged between the head 14 and the housing 12. The at least one drive body 36 is held partially in an associated longitudinal groove 37 of the head 14 and partially in an associated longitudinal groove 38 of the housing 12. Therefore, the torque transmission can be provided and the drive body 36 during the relative displacement between the head 14 and the housing 12 can roll, so that a free relative displacement is provided.

An important feature of this construction is that the at least one drive body 36 is arranged between the head 14 and the housing 12 with respect to its position in a longitudinal direction, or in other words in direction substantially parallel to the longitudinal center axis 8 without guidance or guidance-free. It is loaded by an elastic clamping member 39 from outside inwardly with a pressing force which holds the at least one drive body 36 in its above mentioned position. In other words it prevents that the drive body 36 falls downwardly in the longitudinal grooves 37, 38 in FIG. 1 and then during the relative displacement between the head 14 and the housing 12 no longer can roll. When compared with known tool holders, a substantial simplification is provided since the otherwise required spherical guiding sleeve for holding the drive body 36 in its position is dispensed with. Such spherical guiding sleeves are not only expensive but also require accurately machined guiding surfaces for the spheres for the spherical guiding sleeve on the head 14 and on the housing 12. This special machining is expensive. Moreover, the spherical guiding sleeves require greater diameter of the tool holder. Finally, it has been shown that the impurities can reach the region of a spherical guiding sleeve and lead in relatively short time to clamping. These problems are eliminated in the tool holder in accordance with the present invention.

Figure 2:
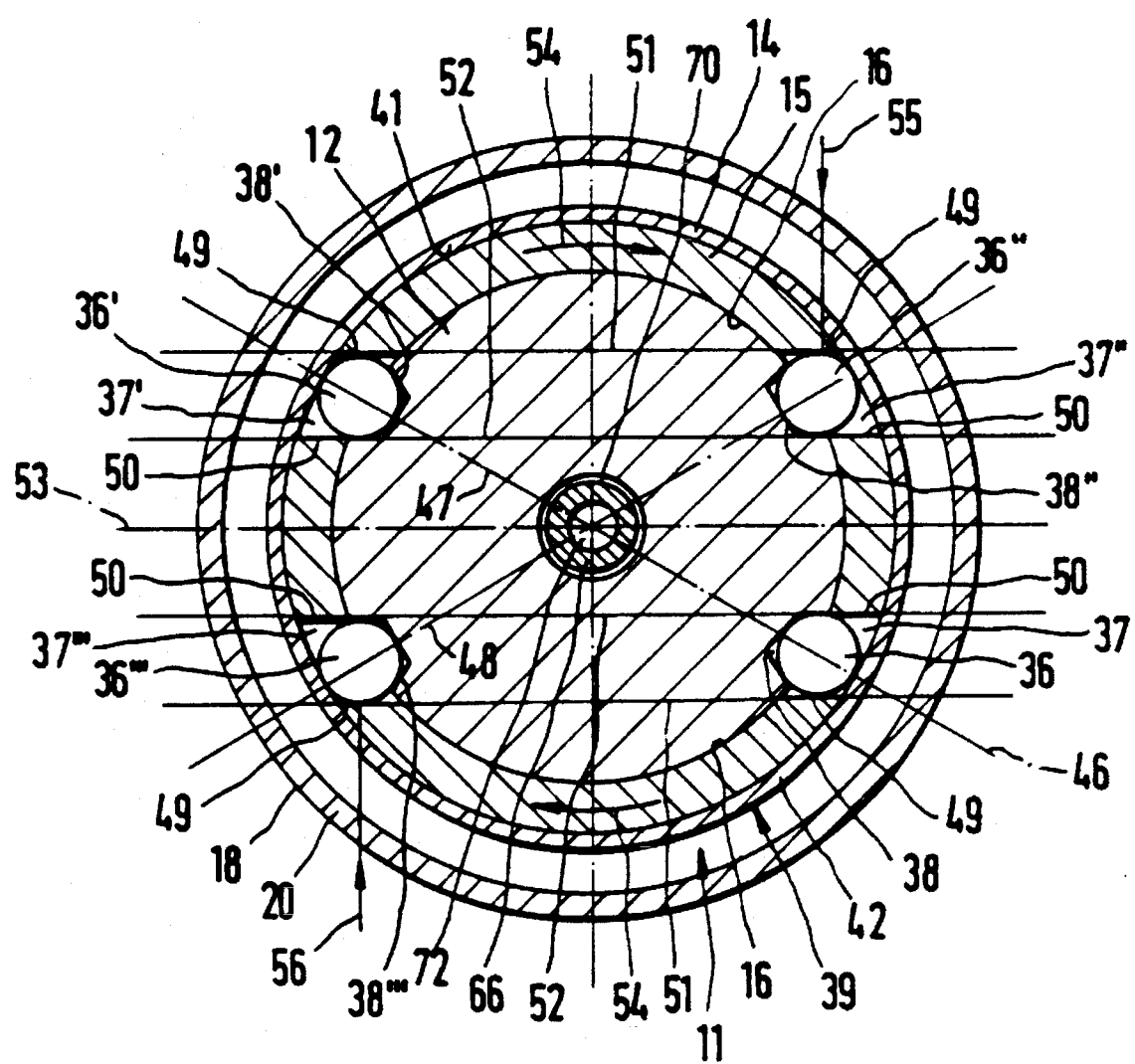
FIG. 2 is a view schematically showing a section of the tool holder taken along the line II—II in FIG. 1.

As shown in FIGS. 1 and 2, the longitudinal groove 37 provided for each drive body 36 in the head 14 is formed as a longitudinal slot 40 which is throughgoing in its cross-section and formed inside the cylinder wall 15 of the head 14. At least one drive body 36 engages in the transverse direction through the associated longitudinal slot 40 in the head 14 and projects insignificantly beyond the outer side 41 of the head 40 in the region of the longitudinal slot 40.

The elastic clamping member 39 is composed in an especially advantageous, simple manner of a circumferential clamping member 42 which at least partially surrounds the head 14 over its outer side 41 in the region of at least one drive body 36. It engages the projecting part of at least one drive body 36 and deploys the pressing force which acts from outside inwardly.

The circumferential clamping member 42 is composed of an elastically springy ring part, for example a ring or a cylinder sleeve, in particular of metal. It is fixed in a longitudinal direction on the head 14, in particular on its outer side 41. For this purpose, the outer side 41 is provided with a ring receptacle 43 with an upper axial shoulder 44, on which the circumferential clamping member 42 can be fixed axially in the axial direction of FIG. 1 from above. The fixing and the opposite side or from below in FIG. 1 is performed by a spring ring 45 on the cylinder 15 of the head 14.

As can be seen from FIG. 2, the circumferential clamping member 42 is a closed ring part. In another, not shown embodiment, the circumferential clamping member 42 instead can be interrupted in an axial longitudinal direction at one point, for example slotted.

Further important features of the longitudinal groove 37, 38 for at least one drive body 36, which form a longitudinal groove pair, are illustrated in FIG. 2 and explained with reference to this Figure.

The at least one longitudinal groove 38 of the housing 12 has a trapezoidal cross-section which is symmetrical. The line of symmetry 46 extends inside a diametrical plane 47 and passes through the center of the housing 12. It can be seen that inside the diametrical plane 47 a further identical longitudinal groove pair 37', 38' with an associated drive body 36 is provided, which are located diametrically opposite to the longitudinal groove pair 37, 38 with the drive body 36. In analogous manner, in the region of another diametrical plane 48 again two diametrically opposite longitudinal groove pairs 37", 38" with associated drive body 36" or 37'", 38'" with the associated drive body 36'" are provided. As a result, four longitudinal grooves 37, 37', 37", 37'" are provided in the head 14 and distributed over the periphery, and further in the associated manner four longitudinal grooves 38, 38', 38", 38'" are provided in the housing 12 and distributed over the periphery, and each longitudinal groove pair has a drive body 36 or 36' or 36" or 36'" respectively. It is especially important that both diametrical planes 47 and 48 extend at an angle of substantially 60° and a complementary angle of substantially 120° relative to one another. This means that for example the both longitudinal groove pairs 37, 38, 37", 38" (right in FIG. 2) are located in a circumferential region and have a circumferential angular distance of substantially 60° relative to one another. This further means that at the opposite side which is left side in FIG. 2 two longitudinal groove pairs 37', 38' and 37'", 38'" are arranged at the circumferential region and offset in the circumferential direction relative to the first mentioned longitudinal groove pairs, and also have a circumferential angular distance of substantially 60° relative to one another. A circumferential region with a circumferential angle of approximately 120° is located between two neighboring longitudinal groove pairs and does not have any grooves. This last mentioned groove-free circumferential region is for example provided between both longitudinal groove pairs 37', 38' and 37", 38" or on the opposite between both longitudinal groove pairs 37, 38 and 37'", 38'".

The longitudinal groove 37 and the three remaining identical longitudinal grooves 37', 37", 37'" of the head 14 are designed identically. They have two opposite flanks 49, 50 which are parallel to one another which correspondingly extend in the plane of a secant 51 and 52. They extend at a radial distance from the longitudinal central axis 8 and thereby the center of the tool holder 9 and therefore substantially parallel to a diametrical plane 53 extending through the center.

The at least one drive body 36 for each longitudinal groove pair is formed for example as a drive sphere or pole. The distance between both flanks 49, 50 of the respective longitudinal groove 37, 37', 37", 37'" of the head 14 substantially corresponds to the diameter of the drive ball or is at least insignificantly greater than this diameter.

The above described design makes the tool holder 9 especially simple and provides the same advantages both for the right running in accordance with arrow 54 and the oppositely directed left running. If the head 14 is driven by the not shown machine spindle in clockwise direction of FIG. 2 and the arrow 54 or in other words in the right running, then with respect to the torque transmission to the housing 12 the longitudinal groove pair 37", 38" with the drive body 36" formed as a drive ball, and on the diametrical plane 48 diametrically opposite the other longitudinal pair 37'", 38'" with the drive body 36'" formed as the drive ball are effective. The corresponding flank 49 of the longitudinal groove 37" and the longitudinal groove 37'" presses against the drive body 36' or 36'". The force at the location and in correspondence with the arrow 55 or 56 is effective, and oriented substantially exactly through the center point of the drive ball and perpendicularly to the flank 49.

Since the force direction in accordance with the arrows 55, 56 is substantially perpendicular to the respective plane of the secant 51 and extends with a distance outside the longitudinal groove 38", 38'" in the housing 12, the drive body 36", 36'" formed as the drive ball is loaded under the action of the respective force so that it is pressed inwardly. In no case they cannot wander outwardly under this loading and therefore load the elastic circumferential clamping member 42. The drive bodies 36", 36'" do not load the circumferential clamping member 42 both during this right running and with the forces acting in direction of the arrow 55, 56, which circumferential clamping member can be therefore formed very thin and elastic. In the simplest case, it is sufficient to provide a thin metallic cylinder sleeve which is pulled with small prestress outside on the cylinder wall 15 of the head so that it clampingly surrounds the insignificantly outwardly projecting drive body 36, 36', 36", 36'" so as to apply an elastic force oriented from outside inwardly.

When the receptacle 11 is driven for a left running and thereby in the opposite direction to the arrow 54 and in counterclockwise direction in FIG. 2, the drive bodies 36, 36' on the diametrical plane. 46 are acted upon by the flanks 49 of the longitudinal grooves 37, 37'. The drive bodies 36, 36' are subjected to forces which are oriented substantially perpendicularly to the flank 49 and to the plane of secant 51 and extend through the center of the drive body 36, 36' formed as the drive ball. Therefore, with respect to the longitudinal groove 38, 38' they are operative so that the respective drive body 36, 36' is forced inwardly and in each case a movement outwardly and a force transmission to the circumferential clamping member 42 is prevented. Thereby the individual drive bodies 36, 36', 36", 36'" formed as the drive balls can be arranged in a simple manner between the head 14 and the housing 12 in a guidance-free manner with respect to their position in the longitudinal direction, and loaded with a pressing force from outside inwardly by the circumferential clamping member 42 formed for example as a thin metallic cylinder sleeve, so that it is sufficient to hold the respective drive body in the associated longitudinal groove pair in a corresponding position.

The above described longitudinal compensating device 31 is located on the outer side of the circumferential clamping member 42 which is provided at the lower end in FIG. 1 with a ring groove 60 on its outer side for supporting a plurality of balls 61 with a circumferential part. A supporting ring 62 which surrounds the circumferential clamping member 42 is further located in the ring space 21 and has a one-side inclined surface 63. It is pressed by a pressure spring 32 with its inclined surface 63 in the axial longitudinal direction or in other words downwardly in FIG. 1, against a projecting circumferential part of the balls 61. A substantially cylinder-sleeve shaped ball holder 64 is arranged in the ring space formed between the head 14 and the outer side of the circumferential clamping member 42. In the axial direction and downwardly in FIG. 1 the ball holder 46 abuts against the outer sleeve 18 and in particular against an axial ring shoulder formed in a transition region to the neck 20. The ball holder 64 in its upper region in FIG. 1 has radially directed openings 65, for example bores, for holding the balls 61. This end region which includes the bores 65 is inclined so that it narrows upwardly in FIG. 1, and its angle of inclination corresponds to the angle of inclination of the inclined surface 63 of the supporting ring 62 at least substantially. The supporting ring 62 is arranged on the inclined, associated end 87 of the ball holder 64 so that the supporting ring 62 with its inclined surface 63 is in contact with the balls 61 which radially at least insignificantly project at this end 87.

When an axially directed pressing force acts from the machine spindle, power tool receptacle and the like and from the receptacle 11 with the axially supported tool 27, then the balls 61 are acted upon by the flank of the ring groove 60 of the circumferential clamping member 42. The stronger the force, the stronger is this action of the balls 61. If a counter force provided by the pressure spring 32 and the incline of the inclined surface 63 of the supporting ring 62 is exceeded, the balls 61 move outwardly with the displacement of the supporting ring 62 against the action of the pressure spring 32. Thereby for the bevel, for example, a thread drill a desired, adjustable pressure is provided. The pressure spring 32 can therefore provide a longitudinal compensation of the pressure during the relative displacement between the head 14 and the housing 12.

When with the axially fixed tool 27 and the housing 12 the receptacle 11 with the head 14 is pulled axially upwardly in FIG. 1 in the opposite direction, the balls 61 located in the ring groove 60, and the ball holder 64 through the balls 61 are moved together with the supporting ring 62 abutting against the ball 61 with the head 14 upwardly, the pressure spring 32 is also loaded with pressure, and thereby a longitudinal compensation between the head 14 and the housing 12 in the pulling direction is possible.

The tool holder 9 is further provided with an inner cooling medium guide which is designed especially simple. It is achieved in that the longitudinal compensating device 31 is supported outwardly and in the outer circumferential region of the cylinder wall 51. The fast exchange chuck has a central inner tube 66 for the cooling medium supply. It is mounted with its upper end in FIG. 1 on the receptacle 11 and extends in the coaxial cylinder opening 16 and in a central bore 67 of the housing 12. The bore 67 has a ring chamber 70 provided for the cooling medium and sealed at its both axial ends by sealing rings 68, 69. The ring chamber is limited from the inner side by the tube 66 and from the outer side by the opening 67. The ring chamber 70 communicates on the one hand through at least one passage 71 in the tube 66, for example a bore in the tube wall, with the interior 72 of the tube 66, on the other hand the ring chamber 70 is connected with passages 73, 74 in the housing 12. The passage 73 extends for example radially and the passage 74 extends for example substantially axis-parallel. Both passages 73, 74 extend substantially outside of the center of the housing 12. The passage 74 leads to the coaxial cylindrical opening 24 of the housing 12.

The free end of the tube 66 located below in FIG. 1 is closed, for example by a plug. It extends through a central axial bore 15 in the housing 12 which has a greater diameter and formed for example as a threaded bore. The end of the tube 66 extends into a chamber 76 formed in the interior of substantially cup-shaped closure member 77 and is closed downwardly. The closure member 77 is screwed with a pin into the opening 77 and thereby mounted on the housing 12.

The closure ember 77 is surrounded by a spring ring 78 which is axially displaceably held in the cylindrical opening 24 of the housing 12. It is sealed in the circumferential direction relative to the housing 12, in particular its cylinder wall 23, by a sealing ring 79.

The closure member 77 is provided at the axial end with at least one radially extending projection 80, in particular a ring shoulder. The projection 80 is formed as an abutment for the blocking ring 78 with the removed fast exchange insert 26. The spring ring 77 at one end has at least one associated radially inwardly projecting abutment 81, for example an abutment shoulder. When the fast exchange insert 26 is removed and thereby the blocking ring 78 is free in the axial direction, and is pressed through an end-side seal 82 tightly against the associated end side of the fast exchange insert, then the blocking ring 78 under the action of the force of the spring 83 which loads it is displaced downwardly in FIG. 1 until the abutment 82 formed at the abutment shoulder abuts against the projection 80 of the closure member 77 formed at the ring shoulder and thereby a pressing-out of the blocking ring 78 is prevented. When after this a fast exchange insert 26 is again inserted, the blocking ring 78 is displaced against the action of the spring 83 to the position of FIG. 2.

The cooling medium supplied to the passage 74 is guided through the passages of the closure member 77 and the blocking ring 78 downwardly in FIG. 1, so that it flows through the central opening in the fast exchange insert 26 and for example through an opening in the tool 27. For this purpose the blocking ring 78 at its upper end in FIG. 1 has at least one transverse passage 84 formed for example as a transverse groove communicating with a passage 74. The transverse passage 84 communicates with a ring chamber 85 which is formed at the circumferential side between the closure member 77 and the blocking ring 78.

The closure member 77 in the region of the free, lower end in FIG. 1 is provided at the outer side with at least one recess 86 or two diametrically opposite recesses. The recess 86 communicates with the ring chamber 85 for supplying the cooling medium.

The cooling medium is supplied for example into the interior of the end 13 of the receptacle 11 and flows into the interior 72 of the tube 66, then through at least one passage 71 flows into the ring chamber 70 and from the latter flows through the passages 73, 74 to at least one transverse passage 84 at the inner end of the blocking ring 78. From the transverse passage 84 the cooling medium flows through the ring chamber 85 and the at least one recess 86, where it is discharged and is supplied into an inner central opening of the fast exchange insert 26.

The closure member 77 and the blocking ring 78 are designed so that when the fast exchange insert 26 is removed and the blocking ring 78 is displaced further downwardly, the cooling medium flow from the ring chamber 85 outwardly is blocked. Therefore, when the fast exchange insert 26 is removed, the cooling medium cannot be discharged.

The above described inner cooling medium supply by the tube 26 mounted in the receptacle 11 is especially simple and inexpensive. Since during a relative displacement between the housing 12 and the head 14 the pressure column of the cooling medium under pressure is not moved, distortions of the relative position between the head 14 and the housing 12 are excluded. Furthermore, the pressure unloading is obtained.

In another, not shown embodiment, the tool holder 9, in particular the fast exchange chuck 10, is not provided with the above described inner cooling medium supply and thereby is especially simple. In accordance with a special design, also the longitudinal compensating device 31 can be dispensed with.

The tool holder 9, in particular the fast exchange chuck 10, is compact, can be made with a relatively small diameter, has a short axial length, and is also operational-reliable and not disturbance-prone, so that even with dirt penetrated into it, its operation is not stopped. It has an inexpensive construction and can be produced inexpensively, so that the leads to a significant cost reduction when compared with known fast exchange chucks.

The chamber 76 is formed in the interior of the closure member 77, and the free end of the tube 66 extends in the chamber more or less deep during the relative movement between the head 14 and the housing 12. This chamber is ventilated outwardly to prevent a build-up of a pressure which can undesirably affect the relative movement. A ventilating passage 29 is provided for the ventilation in the housing 12. For example, it is formed as at least one radial passage extending outwardly to a longitudinal groove 38 and ventilated through the longitudinal groove 38 and further the longitudinal groove 37 and the ring chamber 21. The ventilating passage 29 communicates in the inner region of the housing 12 with a central chamber 30 which in turn communicates with the chamber 76 in the closure member 77. In a not shown embodiment this can be provided for example through one or several openings in the tube 66, in particular in the tubular wall. In the shown embodiment a ring chamber 88 remains between the closure member 77 and the free end of the tube 66 extending in it. It produces the communication between the chamber 76 and the central chamber 30 and the ventilating passage 29 so that the chamber 76 can be ventilated in an especially simply manner.

It will be understood that each of the elements described above, or two or more together, may also find a useful application in other types of constructions differing from the types described above.

While the invention has been illustrated and described as embodied in a tool holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool holder, particularly a fast exchange chuck preferably for thread cutting, thread shaping, or the like, comprising a receptacle having one end receivable in a machine spindle, a machine tool receptacle, or the like, and another opposite end provided with a head having a coaxial cylindrical head opening; a housing received and guided in said cylindrical head opening non-rotatably but displaceably in a longitudinal direction and provided with a coaxial cylindrical housing opening; a fast exchange insert insertable in the housing opening; torque-transmitting means for transmitting torque between said head and said housing and including a head longitudinal groove provided in said head, a housing longitudinal groove provided in said housing, and at least one drive body partially received in each of said longitudinal grooves so as to transmit torque between said head and said housing and to roll during a relative displacement between said head and said housing, said at least one drive body being arranged between said head and said housing guidance-free with respect to its position in a longitudinal direction and being acted upon from outside inwardly with a pressing force; and an elastic clamping member applying the pressing force from outside inwardly to said drive member.

2. A tool holder as defined in claim 1, wherein said head has a cylinder wall, said head longitudinal groove being formed as a longitudinal slot which is throughgoing in a transverse direction and provided inside said cylinder wall.

3. A tool holder as defined in claim 2, wherein said at least one drive body engages in a transverse direction through said longitudinal slot and projects at least insignificantly over an outer side of said head in the region of said longitudinal slot.

4. A tool holder as defined in claim 1, wherein said elastic clamping member is formed as a circumferential clamping member which at least partially surrounds said head over its outer side in the region of said at least one drive body and engages a projecting part of said at least one drive body from outside.

5. A tool holder as defined in claim 4, wherein said circumferential clamping member is formed as an elastically springy ring-shaped element of metal.

6. A tool holder as defined in claim 5, wherein said ring-shaped element is formed as a ring.

7. A tool holder as defined in claim 5, wherein said ring-shaped element is formed as a cylinder sleeve.

8. A tool holder as defined in claim 4, wherein said circumferential clamping member is fixed on said head in an axial longitudinal direction.

9. A tool holder as defined in claim 4, wherein said circumferential clamping member is interrupted in a longitudinal direction in at least one point.

10. A tool holder as defined in claim 1, wherein said housing is provided with a plurality of said housing longitudinal grooves, at least one of said housing longitudinal grooves having a trapezoidal cross-section which is symmetrical and has a line of symmetry extending in a diametrical plane through a center of said housing.

11. A tool holder as defined in claim 1, wherein said head has a plurality of said head longitudinal grooves, at least one of said head longitudinal grooves being formed as a longitudinal slot which has two opposite and substantially parallel flanks, each extending in a plane of a secant at a radial distance from a center of said housing and parallel to a diametrical plane extending through said center of said housing.

12. A tool holder as defined in claim 1, wherein said at least one drive body is formed as a drive ball.

13. A tool holder as defined in claim 11, wherein said at least one drive body is formed as a drive ball, said flanks of said longitudinal slot being spaced from one another by a distance substantially corresponding to a diameter of said drive ball.

14. A tool holder as defined in claim 11, wherein said at least one drive body is formed as a drive ball, said flanks of said longitudinal slot being spaced from one another by a distance which is at least insignificantly greater than said diameter of said drive ball.

15. A tool holder as defined in claim 1, wherein said head has four said head longitudinal grooves and said housing has four said housing longitudinal grooves so as to form four cooperating longitudinal groove pairs, said torque transmitting means including four said drive bodies each located in a respective one of said longitudinal groove pairs.

16. A tool holder as defined in claim 15, wherein first two of said longitudinal groove pairs are located in a first circumferential region, while second two of said longitudinal groove pairs are located at a second circumferential region which is offset relative to said first circumferential region by a circumferential angular distance of substantially 60° and so that between two neighboring ones of said longitudinal groove pairs a circumferential region of substantially 120° which does not have any grooves is provided.

17. A tool holder as defined in claim 15, wherein each of said longitudinal groove pairs is located diametrically opposite to another one of said longitudinal groove pairs in a diametrical plane so that all said longitudinal groove pairs are located opposite to each other in two diametrical planes, said two diametrical planes extending relative to one another at an angle of substantially 60° and a complementary angle of substantially 120°.

18. A tool holder as defined in claim 1; and further comprising an axial longitudinal compensating device for pulling and pressing and operating simultaneously as a bevel pressure amplifier, said device being arranged on an outer side of said head and on an outer side of said clamping member.

19. A tool holder as defined in claim 18, wherein said clamping member is formed as a circumferential clamping member, said circumferential clamping member has an outer side provided with a ring groove, said longitudinal compensating device including a plurality of balls having a circumferential part located in said ring groove, a supporting ring having one side provided with an inclined surface and surrounding said circumferential clamping member, and a spring pressing said supporting member so that said inclined surface abuts in an axial longitudinal direction against a projecting circumferential part of said balls.

20. A tool holder as defined in claim 19, wherein said spring is formed as a pressure spring.

21. A tool holder as defined in claim 19; and further comprising an outer sleeve which surrounds said housing and is fixedly connected with the latter, said outer sleeve having a cylindrical neck which limits a ring chamber with said head and said outer side of said circumferential clamping member, said longitudinal compensating device being arranged in said ring chamber.

22. A tool holder as defined in claim 21; and further comprising a ball holder abutting against said outer sleeve in an axial direction and arranged in said ring chamber, said ball holder having openings in which said balls are held, said supporting ring being arranged on an associated end of said ball holder and contacting with said inclined surface said balls which at least insignificantly project at said end.

23. A tool holder as defined in claim 1; and further comprising a central inner pipe for a cooling medium supply, said pipe having an end mounted on said receptacle and extending from said end into said head and into said head opening and also in a central opening of said housing, said tube containing an inner ring chamber provided for a cooling medium and sealed at both its axial ends, said ring chamber communicating with an interior of said tube through at least one channel and also communicating with a plurality of channels provided in said housing outside its center and leading to said housing opening.

24. A tool holder as defined in claim 23; and further comprising a substantially cup-shaped closure member which is mounted on said housing and forms an additional chamber, said tube having a free end which is closed and extends through a central axial opening in said housing and into said additional chamber.

25. A tool holder as defined in claim 23; and further comprising a blocking ring which is axially displaceably arranged in said housing opening and surrounds said closure member, said blocking ring being sealed in a a circumferential direction relative to said housing.

26. A tool holder as defined in claim 25, wherein said closure member has an axial end provided with at least one radially extending projection, said blocking ring having an end provided with at least one radially inwardly extending projection which abuts against said radially extending projection of said closure member when said blocking ring is displaced by a spring force.

27. A tool holder as defined in claim 26, wherein said radially extending projection of said closure member is formed with a ring shoulder, said radially inwardly extending abutment of said blocking ring being formed as an abutment shoulder.

28. A tool holder as defined in claim 24, wherein said blocking ring has an end provided with at least one transverse passage, said housing having a substantially axis-parallel passage with which said at least one transverse passage communicates, said closure member and said blocking ring forming therebetween a ring chamber at a circumferential side with which said transverse passage is connected.

29. A tool holder as defined in claim 28, wherein said transverse passage is formed as a transverse groove.

30. A tool holder as defined in claim 29, wherein said closure member has a free end provided with at least one recess which communicates with said ring chamber within said closure member and said blocking ring for supplying the cooling medium.

31. A tool holder as defined in claim 24, wherein said wherein said chamber of said closure member in which said free end of said tube extends is ventilated toward outside.

32. A tool holder as defined in claim 31, wherein said housing has a ventilating opening, said pipe having an opening through which said chamber of said closure member communicates with said ventilating passage.

33. A tool holder as defined in claim 31, wherein said housing has a ventilating opening, said pipe having an opening through which said chamber of said closure member communicates with said ventilating passage, said closure member and the free end of said tube extending in said closure member having a ring chamber therebetween through which said chamber of said closure member communicates with said ventilating passage.

* * * * *